United States Patent
Rajavenkatanarayanan et al.

(10) Patent No.: US 12,521,052 B2
(45) Date of Patent: Jan. 13, 2026

(54) METHOD FOR FLEET MANAGEMENT AND DRIVER ANALYTICS BASED ON DRIVER AND SCENE MONITORING AND UNDERSTANDING

(71) Applicant: GM GLOBAL TECHNOLOGY OPERATIONS LLC, Detroit, MI (US)

(72) Inventors: Akilesh Rajavenkatanarayanan, Macomb, MI (US); Manoj Kumar Sharma, Troy, MI (US); Jonathon Markowski, Royal Oak, MI (US); Tetyana Wasko, West Bloomfield, MI (US); Kiran Babu, Detroit, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 18/665,458

(22) Filed: May 15, 2024

(65) Prior Publication Data
US 2025/0352105 A1 Nov. 20, 2025

(51) Int. Cl.
*A61B 5/18* (2006.01)
*B60K 35/10* (2024.01)
*G07C 5/00* (2006.01)
*H04W 4/40* (2018.01)

(52) U.S. Cl.
CPC ............... *A61B 5/18* (2013.01); *B60K 35/10* (2024.01); *G07C 5/008* (2013.01); *H04W 4/40* (2018.02)

(58) Field of Classification Search
None
See application file for complete search history.

(56) References Cited

U.S. PATENT DOCUMENTS

| | | | |
|---|---|---|---|
| 10,351,050 B1* | 7/2019 | Elwell | F21S 41/141 |
| 11,699,250 B1* | 7/2023 | McCann | B60K 35/25 |
| | | | 345/628 |
| 12,251,994 B1* | 3/2025 | Balasubramanyan | |
| | | | G06V 40/18 |
| 2008/0291008 A1* | 11/2008 | Jeon | G06V 10/95 |
| | | | 340/539.1 |
| 2012/0212320 A1* | 8/2012 | Oberholtzer | B60Q 1/52 |
| | | | 340/3.2 |
| 2022/0381565 A1* | 12/2022 | Stenneth | G01C 21/3461 |
| 2022/0396148 A1* | 12/2022 | Rodrigues | G06V 20/56 |

(Continued)

FOREIGN PATENT DOCUMENTS

DE 102013002875 A1 * 9/2014 ............. B60Q 1/381

*Primary Examiner* — Muhammad Adnan
(74) *Attorney, Agent, or Firm* — Ingrassia Fisher & Lorenz, LLP | IF&L

(57) ABSTRACT

Methods and systems are provided for fleet management of driver analytics for vehicles. In one embodiment, the disclosed systems include one or more vehicle sensors, one or more transceivers, and one or more processors. The one or more vehicle sensors are configured to collect sensor data pertaining to a cognitive load of a driver of a vehicle. The one or more transceivers are configured to transmit the sensor data to a remote server that is physically remote from the plurality of vehicles, via a wireless communications network. The one or more processors are configured to at least facilitate aggregating the internal data and the external data for all of the plurality of vehicles in the fleet, generating aggregated fleet data; and providing one or more control actions for the plurality of vehicles of the fleet, based on the aggregated fleet data.

18 Claims, 4 Drawing Sheets

(56) References Cited

U.S. PATENT DOCUMENTS

2024/0027049 A1* 1/2024 Spinger ................ B60Q 1/1415
2025/0182339 A1* 6/2025 Austin ................... G06T 11/00
2025/0182613 A1* 6/2025 Austin ................... B60Q 1/143

* cited by examiner

METHOD FOR FLEET MANAGEMENT AND
DRIVER ANALYTICS BASED ON DRIVER
AND SCENE MONITORING AND
UNDERSTANDING

TECHNICAL FIELD

The technical field generally relates to the collection of data, including the use of data collected form a fleet of vehicles and their drivers.

BACKGROUND

Fleets of vehicles may encounter a number of potential circumstances, including external events as well as internal events, for example that may affect the cognitive load of a driver and/or other parameters pertaining to vehicles in the fleet. However, existing techniques may not always be optimal, for example with respect to utilizing data as to the potential circumstances in managing and controlling the vehicles in the fleet.

Accordingly, it is desirable to provide improved methods and systems for generating and utilizing data pertaining to vehicles in a fleet and their surrounding environment, including for use in managing and controlling the fleet.

SUMMARY

In accordance with an exemplary embodiment, a method is provided that includes: collecting, via one or more vehicle sensors, sensor data pertaining to a cognitive load of a driver of a vehicle; transmitting, via one or more transceivers, the sensor data to a remote server that is physically remote from the plurality of vehicles, via a wireless communications network; and determining, via one or more processors, a cognitive load for the driver based on the sensor data; and providing one or more actions with respect to a driver of the vehicle based on the cognitive load, in accordance with instructions provided by the one or more processors.

Also in an exemplary embodiment, the step of collecting the sensor data includes collecting, via one or more internal vehicle sensors, internal data as to circumstances within a cabin of each of a plurality of vehicles of a fleet that may affect the cognitive load; collecting, via one or more external vehicle sensors, external data as to circumstances outside the cabin of each of the plurality of vehicles of the fleet that may affect the cognitive load; the step of transmitting the sensor data includes the internal data and the external data to the remote server via the wireless communications network; and the method further includes aggregating, via the one or more processors, the internal data and the external data for all of the plurality of vehicles in the fleet, generating aggregated fleet data; and providing, via instructions provided by the one or more processors, one or more driver-related control actions for the plurality of vehicles of the fleet, based on the aggregated fleet data.

Also in an exemplary embodiment, the method further includes determining, via the one or more processors, one or more external events pertaining to the cognitive load for each of the plurality of vehicles in the fleet; determining, via the one or more processors, one or more internal circumstances pertaining to the cognitive load for each of the plurality of vehicles in the fleet, including internal distractions that are likely to cause stress, distraction, or both for the driver; and correlating, via the one or more processors, the one or more internal circumstances with the one or more external events for each of the plurality of vehicles in the fleet.

Also in an exemplary embodiment, the method further includes obtaining, via one or more input sensors, anonymous feedback from a driver of each of the plurality of vehicles of the fleet, including via the driver's interaction with a display screen, verbal feedback from the driver, or both; wherein the correlating is performed via the one or more processors further using the anonymous feedback.

Also in an exemplary embodiment, the method further includes correlating, via the one or more processors, the one or more external events with the cognitive load, based on respective time stamps provided to the one or more external events and to the cognitive load via the one or more processors.

Also in an exemplary embodiment, the cognitive load is calculated using the internal data as obtained via one or more biometric sensors for the driver.

Also in an exemplary embodiment, the cognitive load is further calculated using operational data obtained via one or more vehicle sensors pertaining to the driver's operation of a respective one of the plurality of vehicles of the fleet.

Also in an exemplary embodiment, the method further includes providing, via a display screen in accordance with instructions provided by the one or more processors, a display for a manger of the fleet, the display including information as to the one or more external events and the cognitive load, including a mapping of the one or more external events and the cognitive load along one or more routes taken by the plurality of vehicles in the fleet, and wherein the display includes a plurality of cognitive load notations corresponding to respective regions of interest along the one or more routes and their corresponding cognitive loads.

Also in an exemplary embodiment, the method further includes determining, via the processor based on the sensor data, whether the cognitive load of the driver was triggered by internal circumstances within the vehicle, or rather by external circumstances that are outside the vehicle; and providing, via instructions provided by the processor, a notification as to the cognitive load and one or more causes thereof, including whether the cognitive load is believed to be caused by external or internal circumstances.

In another exemplary embodiment, a system is provided that includes one or more vehicle sensors, one or more transceivers, and one or more processors. The one or more vehicle sensors are configured to collect sensor data pertaining to a cognitive load of a driver of a vehicle. The one or more transceivers are configured to transmit the sensor data to a remote server that is physically remote from the plurality of vehicles, via a wireless communications network. The one or more processors are configured to at least facilitate aggregating the internal data and the external data for all of the plurality of vehicles in the fleet, generating aggregated fleet data; and providing one or more control actions for the plurality of vehicles of the fleet, based on the aggregated fleet data.

Also in an exemplary embodiment, the one or more sensors include: one or more internal vehicle sensors configured to collect internal data as to circumstances within a cabin of each of a plurality of vehicles of a fleet that may affect the cognitive load; one or more external vehicle sensors configured to collect external data as to circumstances outside the cabin of each of the plurality of vehicles of the fleet that may affect the cognitive load; the one or more transmitters are configured to transmit the internal data and the external data to the remote server via the wireless communications network; and the one or more processors are configured to at least facilitate aggregating the internal data and the external data for all of the plurality of vehicles in the fleet, generating aggregated fleet data; and providing, via instructions provided by the one or more processors, one or more driver-related control actions for the plurality of vehicles of the fleet, based on the aggregated fleet data.

Also in an exemplary embodiment, the one or more processors are further configured to at least facilitate determining one or more external events pertaining to the cognitive load for each of the plurality of vehicles in the fleet; determining one or more internal circumstances pertaining to the cognitive load for each of the plurality of vehicles in the fleet; and correlating the one or more internal circumstances with the one or more external events for each of the plurality of vehicles in the fleet.

Also in an exemplary embodiment, the system further includes one or more input sensors configured to obtain anonymous feedback from a driver of each of the plurality of vehicles of the fleet, including via the driver's interaction with a display screen, verbal feedback from the driver, or both; and the one or more processors are configured to perform the correlating further using the anonymous feedback.

Also in an exemplary embodiment, the one or more processors are further configured to at least facilitate correlating the one or more external events with the cognitive load, based on respective time stamps provided to the one or more external events and to the cognitive load via the one or more processors.

Also in an exemplary embodiment, the one or more processors are further configured to calculate the cognitive load using the internal data as obtained via one or more biometric sensors for the driver.

Also in an exemplary embodiment, the one or more processors are further configured to calculate the cognitive load using operational data obtained via one or more vehicle sensors pertaining to the driver's operation of a respective one of the plurality of vehicles of the fleet.

Also in an exemplary embodiment, the system further includes a display screen; and the one or more processors are further configured to at least facilitate providing, via the display screen in accordance with instructions provided by the one or more processors, a display for a manger of the fleet, the display including information as to the one or more external events and the cognitive load, including a mapping of the one or more external events and the cognitive load along one or more routes taken by the plurality of vehicles in the fleet.

Also in an exemplary embodiment, the display includes information as to the one or more external events and the cognitive load, including a mapping of the one or more external events and the cognitive load along one or more routes taken by the plurality of vehicles in the fleet.

Also in an exemplary embodiment, the processor is further configured to at least facilitate determining, based on the sensor data, whether the cognitive load of the driver was triggered by internal circumstances within the vehicle, or rather by external circumstances that are outside the vehicle; and providing a notification as to the cognitive load and one or more causes thereof, including whether the cognitive load is believed to be caused by external or internal circumstances.

In another exemplary embodiment, a system is provided that includes a fleet including a plurality of vehicles, each vehicle of the plurality of vehicles including one or more internal vehicle sensors configured to collect internal data as to circumstances within a cabin of the vehicle pertaining to a cognitive load of a driver of the vehicle; one or more external vehicle sensors configured to collect external data as to circumstances outside the cabin of the vehicle pertaining to the cognitive load of the driver of the vehicle; one or more transceivers configured to transmit the internal data and the external data via a wireless communications network; and a remote server that is physically remote from the plurality of vehicles and that includes a transceiver configured to receive the internal data and the external data from each of the plurality of vehicles of the fleet, via the wireless communications network; and one or more processors that are configured to at least facilitate aggregating the internal data and the external data for all of the plurality of vehicles in the fleet, generating aggregated fleet data; and providing one or more driver-related control actions for the plurality of vehicles of the fleet, based on the aggregated fleet data and the cognitive load.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
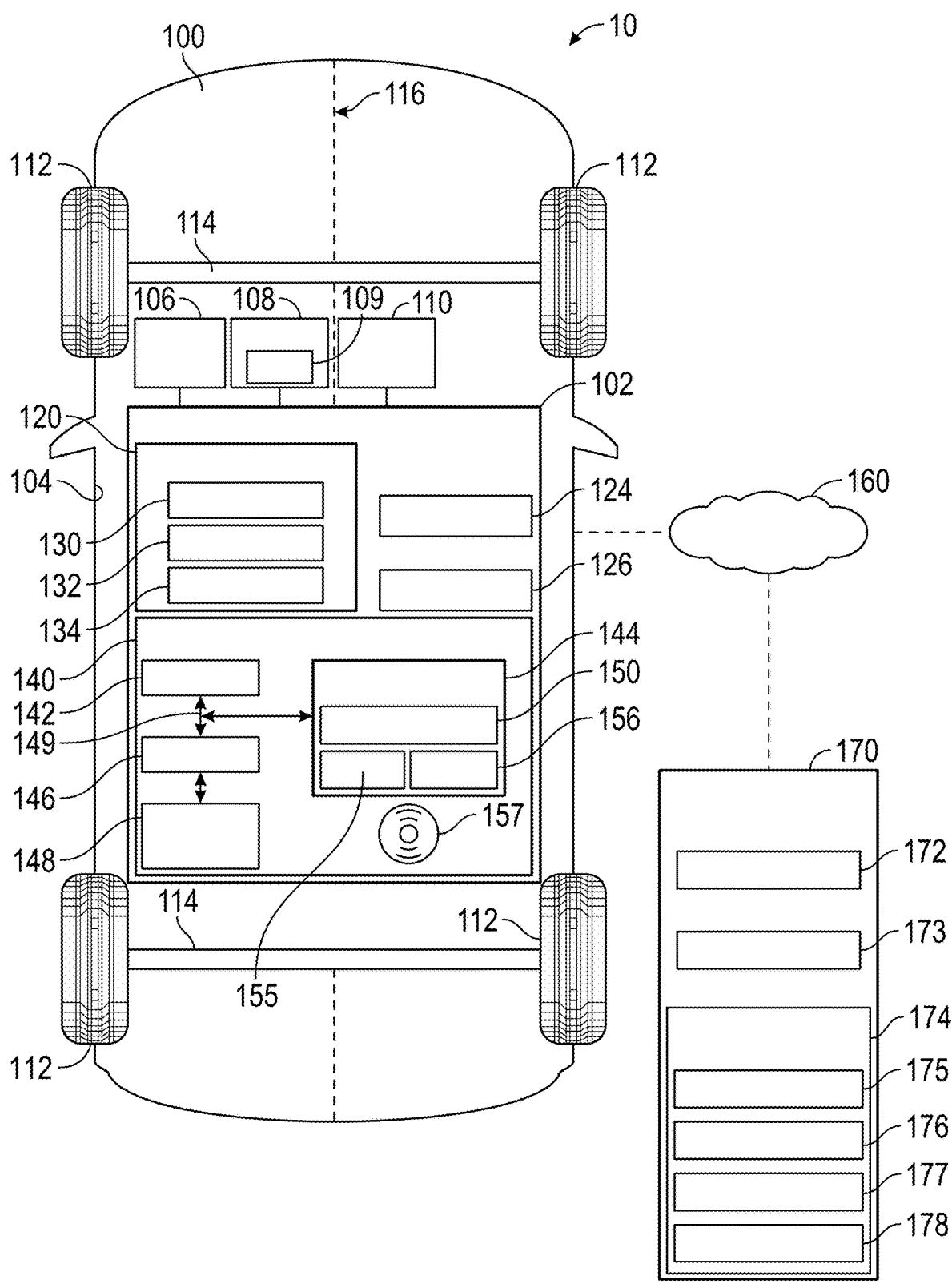
FIG. 1 is a functional block diagram of a system, including a vehicle that is representative of a fleet of vehicles, and a remote server, that is configured for generating and aggregating data from across the fleet pertaining to vehicles in the fleet and their external environment, and that can be used via the remote server in managing and controlling the vehicles in the fleet, in accordance with an exemplary embodiment.

FIG. 1 illustrates a system 10. In various embodiments, and as described below, the system 10 includes a fleet of vehicles 100 and a remote server 170. In various embodiments, the vehicle 100 depicted is represented as a representative vehicle of a fleet of vehicles 100. Also in various embodiments, the system 10 provides for generating and aggregating data from across the fleet pertaining to vehicles 100 in the fleet and their external environment, and that can be used via the remote server 170 in managing and controlling the vehicles 100 in the fleet. In various embodiments, the system 10 performs these tasks in accordance with the process 200 of FIG. 2 and the implementations thereof of FIGS. 3-5, in accordance with exemplary embodiments.

Specifically, as described in greater detail further below, in various embodiments the vehicle 100 collects data that pertaining to external events surrounding the vehicle 100 (e.g., including construction zones, school zones, weather conditions, road conditions, traffic conditions, and the like) as well as operation of the vehicle 100 (e.g., including speed, acceleration, steering, and the like), in addition to characteristics of the driver of the vehicle 100 (e.g., vital signs, other biometric information, camera images, and/or other data pertaining to the driver, actions thereof, and a cognitive load thereof). Also in various embodiments and as described in greater detail further below, the system 10 processes the various types of data, aggregates the data across all of the vehicles 100 in the fleet, relates the data to external events facing the vehicles, maps the data along routes taken by the vehicles 100 in the fleet, and transmits the data to the remote server 170, where the data is used for managing and controlling the vehicles 100 in the fleet. In various embodiments, the collection, processing, and use of the data in this manner is performed via one or more processors depicted in FIG. 1, such as the processor 142 of the vehicle 100 and/or the processor 173 of the remote server 170 of FIG. 1.

Figure 2:
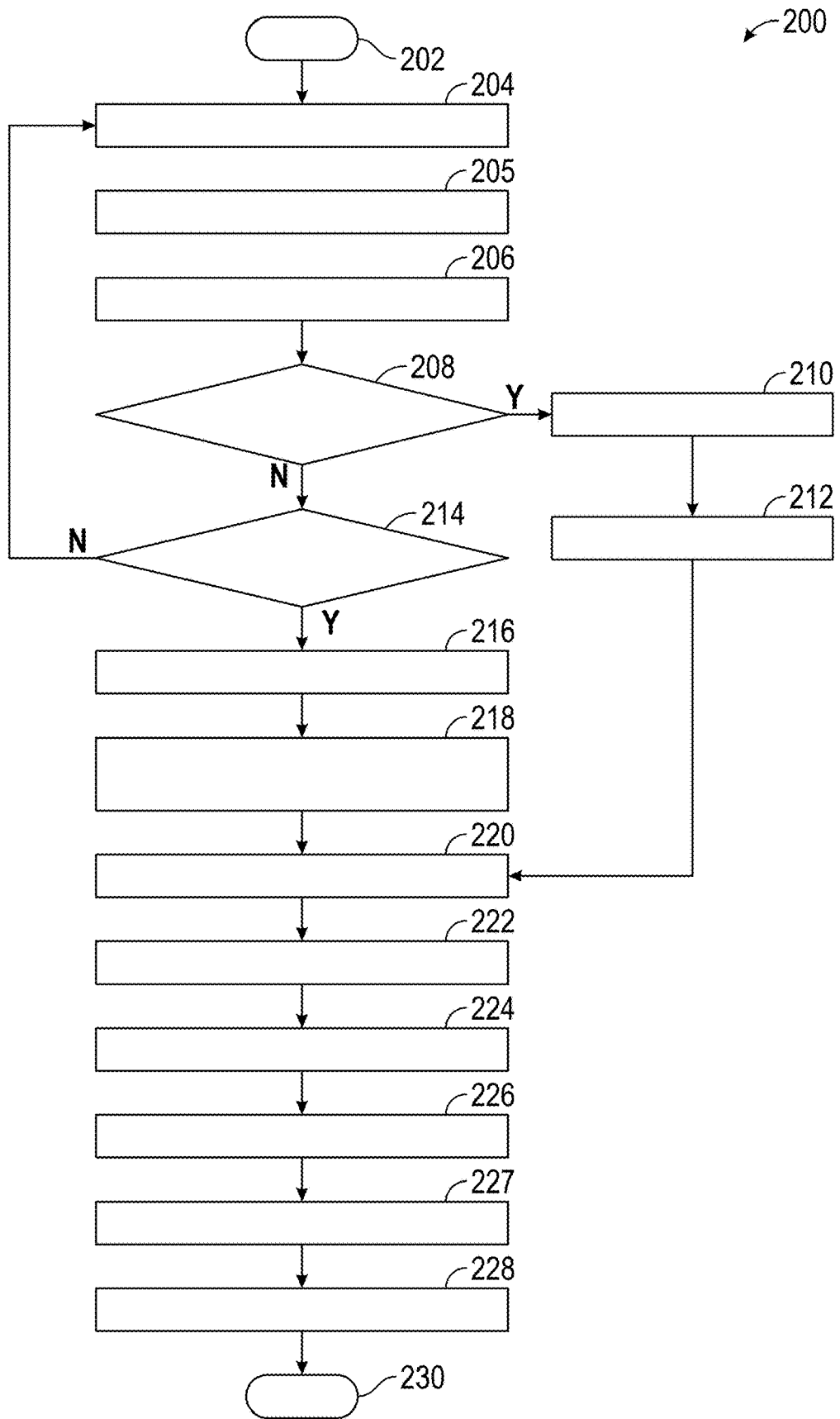
FIG. 2 is a flowchart of a process for generating and aggregating data from a fleet of vehicles and their external environment, and that can be used in managing and controlling the vehicles in the fleet, and that can be implemented in connection with the system of FIG. 1, in accordance with an exemplary embodiment.

In various embodiments, the vehicle 100 represents one of a number of different vehicles 100 of a fleet of vehicles 100 that operate on roads or other paths (collectively referred to as "roadways" herein). While a single vehicle 100 is depicted in FIG. 1, it will be appreciated that the system 10 may include any number of vehicles 100 that, working together and with the remote server 170, collectively perform the process 200 that is depicted in FIG. 2 and the implementations of FIGS. 3-5 and described further below in connection therewith. In addition, while the singular term "vehicle" may be used at times, it will be appreciated that this refers to any number of different vehicles (e.g., in a fleet or otherwise used together in the system 10 and in performing the process 200 of FIG. 2 and the implementations of FIGS. 3-5).

In various embodiments, each vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, some of the vehicles 100 (in a fleet) may be operated in whole or in part by a human drivers, whereas other of the vehicles 100 may comprise an autonomous or semi-autonomous vehicle, for example in which vehicle control (including acceleration, deceleration, braking, and/or steering) is automatically planned and executed by the control system 102, in whole or in part. In addition, certain vehicles 100 may be operated by a human at certain times and via automated control at other times, in certain embodiments. Also in various embodiments, some of the vehicles 100 include automatic functionality via computer models that are trained using the data that is generated and processed via the system 10 after protection of the privacy thereof.

In the depicted embodiment, the vehicle 100 includes a body 104 that is arranged on a chassis 116. The body 104 substantially encloses other components of the vehicle 100. The body 104 and the chassis 116 may jointly form a frame.

The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions that may be controlled automatically via the control system 102, for example in certain circumstances. In certain embodiments, some of the vehicles 100 may be operated by human drivers, whereas other of the vehicles 100 may be assisted and automated driving vehicles, for automated control of the drive system 110 and/or other vehicle components.

As depicted in FIG. 1, the vehicle 100 also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering wheel 109 that is part of a steering column coupled to the axles 114 and/or the wheels 112) that are controlled via inputs provided by a driver (e.g., via the steering wheel 109 in certain embodiments) and/or automatically via the control system 102.

In the embodiment depicted in FIG. 1, in certain embodiments, the control system 102 is coupled to the braking system 106, the steering system 108, and the drive system 110. In various embodiments, the control system 102 at least facilitates the generating, processing, and transmission of data for the vehicle 100 (e.g., including external data pertaining to conditions surrounding the vehicle 100, internal data as to the driver or occupants of the vehicle 100, and operational data as to operation and movement of the vehicle 100).

As depicted in FIG. 1, in various embodiments, the control system 102 includes a sensor array 120, a display 124 (e.g., including a display screen), a transceiver 126, and a controller 140.

In various embodiments, the sensor array 120 obtains sensor data for generating the data. In various embodiments, the sensor array 120 includes one or more internal sensors 130 (such as interior cameras, biometric sensors, and so on) for monitoring inside a cabin of the vehicle 100 (e.g., for monitoring a driver of the vehicle 100) and for receiving feedback from a driver of the vehicle 100 (e.g., via one or more input sensors such as a touch screen, a rotary knob, a microphone, one or more sensors of a smart phone and/or other electronic device of the driver, and so on). Also in certain embodiments, the sensor array 120 may also include one or more other external sensors 132 (e.g., external radar, sonar, LIDAR, GPS and/or other satellite-based sensors and/or other navigation sensors) for monitoring outside the vehicle 100 (e.g., for monitoring weather conditions, road conditions, construction zones, school zones, traffic conditions, and the like for an environment surrounding the vehicle). In addition, in certain embodiments, the sensor array 120 further includes one or more vehicle sensors 134 (e.g., vehicle position sensors, speed sensors, accelerometers, braking sensors, steering sensors, and so on) pertaining to movement and operation of the vehicle 100.

In various embodiments, the vehicle 100 also includes a transceiver 126. In various embodiments, the transceiver 126 communicates with the remote server 170 pertaining to the data (including the sensor data from various sensors of the sensor array 120) and/or the processing thereof.

In certain embodiments, the display 124 provides information for a driver and/or other passengers of the vehicle 100, for example pertaining to feedback to be obtained by the driver and/or other passengers of the vehicle 100, and/or for communicating instructions and/or controls from the remote server 170 including those pertaining to operation of the vehicle 100.

In various embodiments, the controller 140 is coupled to the sensor array 120, as well as to the display 124 and the transceiver 126 (e.g., including for obtaining the sensor data, processing the sensor data, and transmitting the sensor data to the remote server 170, as well as for receiving and implementing instructions from the remote server 170 for management of the vehicle 100 and/or for the fleet of vehicles 100).

In various embodiments, the controller 140 comprises a computer system, and includes a processor 142, a memory 144, an interface 146, a storage device 148, and a computer bus 149. In various embodiments, the controller (or computer system) 140 obtains sensor data from the sensor array 120, and in certain embodiments additional data via the transceiver 126 (e.g., as to weather, traffic, and/or road conditions as may also be obtained from one or more third party sources in certain embodiments). In various embodiments, the controller 140 processes the data, including the sensor data pertaining to external conditions from the vehicle 100, internal circumstances for the vehicle 100 (including that may cause stress, distraction, or both, for the driver), and operation of the vehicle 100, and correlates the different types of data and provides for transmission to the remote server 170 for management and control of the vehicles 100 in the fleet. In various embodiments, the controller 140 provides these and other functions in accordance with the steps of the processes and implementations depicted in FIGS. 2-5 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely. In certain embodiments, the controller 140 of the vehicle 100 also performs functions in concert with the remote server 170, described further below.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 149. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 150 contained within the memory 144 and, as such, controls the general operation of the controller 140 and the computer system of the controller 140, generally in executing the processes described herein, such as the processes and implementations depicted in FIGS. 2-5 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 150 along one or more databases 155 (e.g., pertaining to the data) and other stored values 156 (e.g., including threshold values for the processing of the data as set forth in the processes and implementations depicted in FIGS. 2-5 and as described further below in connection therewith in accordance with exemplary embodiments).

The bus 149 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the navigation system 122. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 150 that executes one or more embodiments of the processes and implementations of FIGS. 2-5 and as described further below in connection therewith. In another exemplary embodiment, the program product may be directly stored in and/or otherwise accessed by the memory 144 and/or a secondary storage device (e.g., disk 157), such as that referenced below.

The bus 149 can be any suitable physical or logical means of connecting computer systems and components. This includes, but is not limited to, direct hard-wired connections, fiber optics, infrared and wireless bus technologies. During operation, the program 150 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

With continued reference to FIG. 1, in various embodiments the vehicle 100 and the remote server 170 communicate via one or more communications networks 160. In various embodiments, the communications networks 160 may include one or more wireless communications networks (e.g., satellite-based, cellular, and/or any number of other different types of wireless communications networks).

Also in various embodiments, the remote server 170 is disposed remote from, or a significant physical distance from, each of the vehicles 100 (e.g., in a fleet). In various embodiments, as depicted in FIG. 1, the remote server 170 includes one or more transceivers 172, processors 173, and computer memory 174 storing a map database 176 along with stored values 178, along with a display 177 for displaying data for one or more fleet managers. In various embodiments, the transceiver 172 is utilized to communicate with the vehicle 100, including with respect to the data and the processing thereof and for the management and control thereof. As depicted in FIG. 1, the transceiver 172, processor 173, memory 174, database 176, stored values 178, and display 177 are similar or identical to the corresponding features of the vehicle 100 (e.g., as to the transceiver 126, processor 142, memory 144, database 155, stored values 156, and display 124 thereof). Also in certain embodiments, the processor 173 processes, or facilitates processing of, the data from the various vehicles 100 in the fleet, including aggregation and mapping of the data, and also in various utilizes the data for managing and controlling the vehicles 100 in the fleet (e.g., for managing operation, deliveries, routes, timing, and so on thereof) (e.g., as described further below in connection with the processes and implementations of FIGS. 2-5).

FIG. 2 is a flowchart of a process 200 for generating and aggregating data from a fleet of vehicles and their external environment, and that can be used in managing and controlling the vehicles in the fleet, in accordance with an exemplary embodiment. The process 200 of FIG. 2 is described in greater detail below in connection with FIG. 2 as well as FIGS. 3 and 4 (which depict illustrative examples of the step of obtaining driver feedback during the process 200) and FIG. 5 (which depicts an illustrative example of the step of providing a display for a fleet manger in accordance with the process 200).

With continued reference to FIG. 2, in various embodiments the process 200 begins at step 202. In various embodiments, the process 200 begins when the vehicle 100 begins operation. It will be appreciated that in exemplary embodiments the steps of the process 200 are performed with respect to each of the vehicles 100 in the fleet.

In various embodiments, external data is collected (step 204). In various embodiments, the external data is collected via the external sensors 132 of FIG. 1, and pertains to external conditions surrounding the vehicle 100 (e.g., as obtained via one or more cameras, GPS systems, radar, Lidar, and/or other external sensors 132 as to road conditions, weather conditions, traffic conditions, construction zones, school zones, and/or other conditions as to the roadway on which the vehicle 100 is travelling and/or other conditions that are external to the vehicle 100).

In various embodiments, internal data is collected (step 205). In various embodiments, the internal data is collected via the internal sensors 130 of FIG. 1, and pertains to internal conditions for the vehicle 100, including as to the driver of the vehicle 100 (e.g., as obtained via one or more cameras, biometric sensors such as body sensors, wearable smart devices, and/or other sensors that obtain vital signs, other biometric information, photographs, and/or other information pertaining to the driver of the vehicle 100), and that may be likely to affect the cognitive load of the driver (e.g., by causing potential stress and/or distraction for the driver).

In various embodiments, operational data is collected (step 206). In various embodiments, the operational data is collected via the vehicle sensors 134 of FIG. 1, and pertains to movement and operation of the vehicle 100, including steering, cornering, speed, acceleration, deceleration, and so on (e.g., as obtained via one or more speed sensors, accelerometers, steering sensors, and/or other vehicle sensors 134).

In various embodiments, a determination is made as to whether an external event has occurred (step 208), including external events that may affect cognitive load (e.g., by potentially contributing to stress and/or distraction for the driver). In various embodiments, one or more processors (such as the processor 142 of the vehicle 100 and/or the processor 173 of the remote server 170) analyze the data (particularly the external data of step 205) in determining whether any external events have occurred and/or are occurring with respect to the vehicle 100 as it is being operated, and that may be likely to affect the cognitive load of the driver (e.g., by causing potential stress and/or distraction for the driver). By way of example, such an external event would be occurring outside the cabin of the vehicle 100, and would include, among other possible external events, a construction zone, a school zone, heavy traffic, a road blockage, a slowdown of traffic, adverse weather conditions (e.g., rain, sleet, snow, hail, and so on), adverse road and/or driving conditions (such as a narrow road, a winding road, a slick surface, or the like), the presence of emergency vehicles, and/or one or more other such external events.

In various embodiments, if it is determined in step 208 that one or more external events have occurred, then a time stamp is made (step 210). In various embodiments, one or more processors (such as the processor 142 of the vehicle 100 and/or the processor 173 of the remote server 170) provide a time stamp for the external event, and save the time stamp for further reference in a computer memory (such as the memory 144 of the vehicle 100 and/or the memory 174 of the remote server 170).

Also in various embodiments, following the creation of the time stamp in step 210, an assessment is made as to one or more internal conditions (step 212). In various embodiments, during step 212, a calculation is performed as to a cognitive load for the driver of the vehicle 100. In various embodiments, one or more processors (such as the processor 142 of the vehicle 100 and/or the processor 173 of the remote server 170) calculate the cognitive load based on the sensor data, particularly the internal data of step 205 and the operational data of step 206. For example, in certain embodiments, the internal data of step 205 is utilized in estimating or calculating the cognitive load based on vital signs of the driver, such as heart rate, sweating, and/or blood pressure (e.g., as obtained via one or more biometric sensors) and/or actions of the driver, such as rapid movement of arms, head, or the like (e.g., as obtained via one or more cameras and/or other sensors). In certain embodiments, the cognitive load may also be estimated or calculated based on the driver's operation of the vehicle, such as reflected via the speed, acceleration, deceleration, cornering, or steering, or the like obtained via the vehicle sensors 134 of FIG. 1.

In various embodiments, the process 200 then proceeds to step 220, as feedback is obtained from the driver, for example as described in greater detail further below.

With reference back to step 208, if it is instead determined that an external event is not detected, then in various embodiments the process 200 proceeds instead to step 214. In various embodiments, a determination is made as to whether a high cognitive load is predicted for the driver. In various embodiments, this is predicted based on a comparison of the cognitive load (e.g., as calculated in a similar manner to step 212, described above) with a predetermined cognitive load threshold (e.g., as stored as one or more stored values 156 and/or 178 in the memory 144 and/or 174 of FIG. 1), via one or more processor (such as the processor 142 and/or the processor 173 of FIG. 1).

In various embodiments, if it is determined in step 214 that a high cognitive load is not predicted, then the process returns to step 204, and data continues to be collected in new iterations of steps 204-206. In various embodiments, steps 204-214 thereafter repeat in various new iterations until a determination is made during an iteration of step 214 that a high cognitive load is predicted.

In various embodiments, once it is determined during an iteration of step 214 that a high cognitive load is predicted, then a time stamp is generated (step 216). In various embodiments, during step 216 one or more processors (such as the processor 142 of the vehicle 100 and/or the processor 173 of the remote server 170) provide a time stamp for the high cognitive load prediction, and save the time stamp for further reference in a computer memory (such as the memory 144 of the vehicle 100 and/or the memory 174 of the remote server 170).

Also in various embodiments, following step 216, a determination is then made as to whether any external events have been detected or reported as having the same time stamp (step 218). Specifically, in various embodiments, during step 218, a determination is made as to whether any external events have a time stamp that is the same as, or that is overlapping with or sufficiently close to (i.e., within a predetermined threshold amount of time from) the time stamp for the high cognitive load of step 216. In various embodiments, when such matching time stamps are found, these are used to correlate the external and internal data together, such as with respect to correlating the external events with the high cognitive load, and so on.

In addition, in certain embodiments, the external data as to external events can be used to identify events external to the fleet for use in identifying events that may be likely to lead to elevated cognitive loads among the fleet drivers, to proactively avoid those events in the same manner as the internal identification process. For example, event data and analysis pertaining to one fleet may be utilized with respect to other fleets in certain embodiments, for example to take similar actions that have been successfully implemented in connection with similar events that have been encountered by other fleets of vehicles, and so on.

In various embodiments, the process then proceeds to the above-referenced step 220, in order to obtain driver feedback.

In various embodiments, during step 220, driver feedback is obtained. Specifically, in various embodiments, driver feedback is obtained that corroborates, confirms, corrects, provides explanation for, and/or that provides other information pertaining to the applicable external and/or internal events (e.g., as determined with respect to steps 208-212 and/or 214-218). In various embodiments, the driver is provided with a notice to confirm, deny, and/or provide additional details, such as the type of external event, the reasons for the high cognitive load, and so on. Also on in various embodiments, the driver feedback is then obtained via one or more internal sensors 130 of FIG. 1 (e.g., input sensors of the vehicle 100 and/or of the driver's smart phone and/or other portable electronic device). In various embodiments, the feedback is provided in an anonymous manner, such that the feedback will be used only in the aggregate and will not be used against the particular driver. In certain embodiments, the driver feedback may be provided via the driver's interaction with a display screen of the vehicle and/or one or more other devices (such as a smart phone and/or other portable electronic device of the user). In certain other embodiments, the feedback may be provided verbally by the user (e.g., by the driver), for example as ascertained and collected via one or more microphones of the vehicle 100 and/or of the user's smart phone and/or other electronic device.

In addition, in certain embodiments, by providing appropriate feedback, the drivers in the fleet are also able to identify situations themselves, that they feel affect their performance (e.g., via a screen interface, by voice feedback to the vehicle's AI/VA (voice assistant) (prompted or unpromoted), and the like). Accordingly, in certain embodiments, when a situation arises in which a driver of one of the fleet's vehicles requests to leave voice feedback even though no corresponding event has been detected previously, the system can use the same methods (e.g., by evaluating fleet vehicle and non-fleet vehicle data and external data) to identify any conditions that could correlate to the driver's feedback, for use in identification of future events.

In addition, in various embodiments, conditions observed in specific places and time-stamps can be then used to model and avoid similar conditions in other places and times, for example by relying (in whole or in part) on the analysis of external data in correlation to vehicle and driver performance and cognitive load. Accordingly, by way of example, in a situation in which a fleet's vehicles have observed and responded to a number of events that reliably affect their drivers' cognitive loads while working (e.g., driving), that fleet can then begin to proactively identify and avoid those conditions throughout their route and shift planning. In various embodiments, this would result in an improved and increasing level of confidence in the external factors to identify and avoid.

Figure 3:
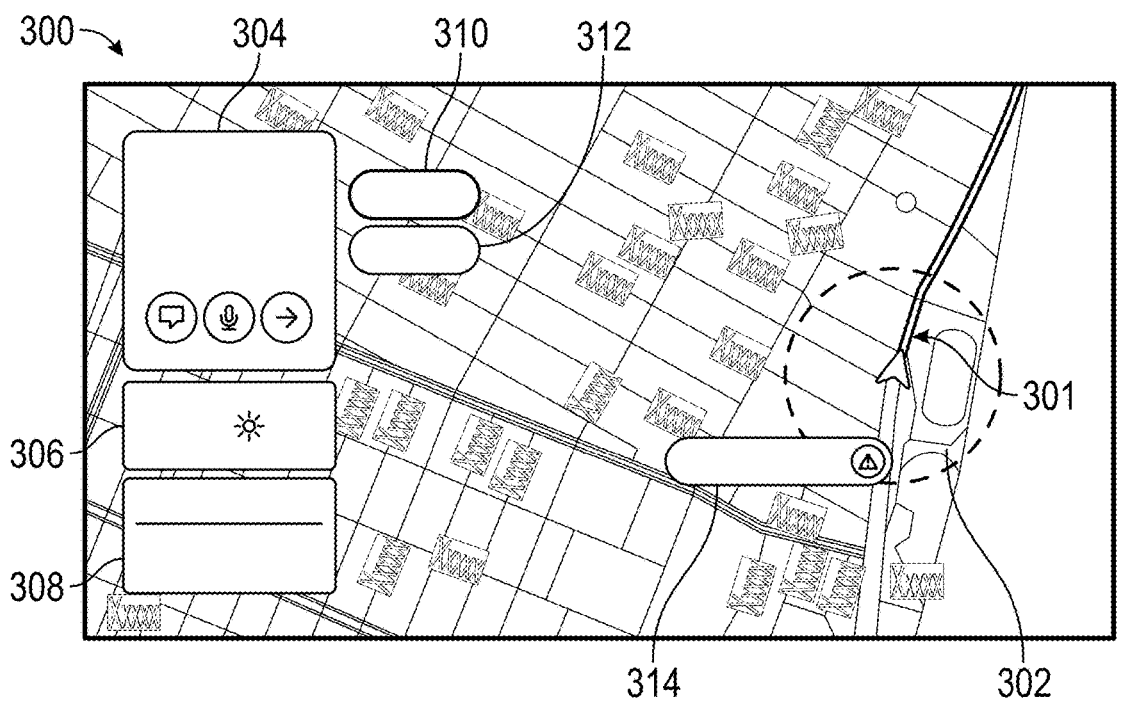
FIGS. 3 and 4 provide exemplary illustrations of a step of the process of FIG. 2, namely, obtaining driver feedback, in accordance with an exemplary embodiment.
Figure 4:
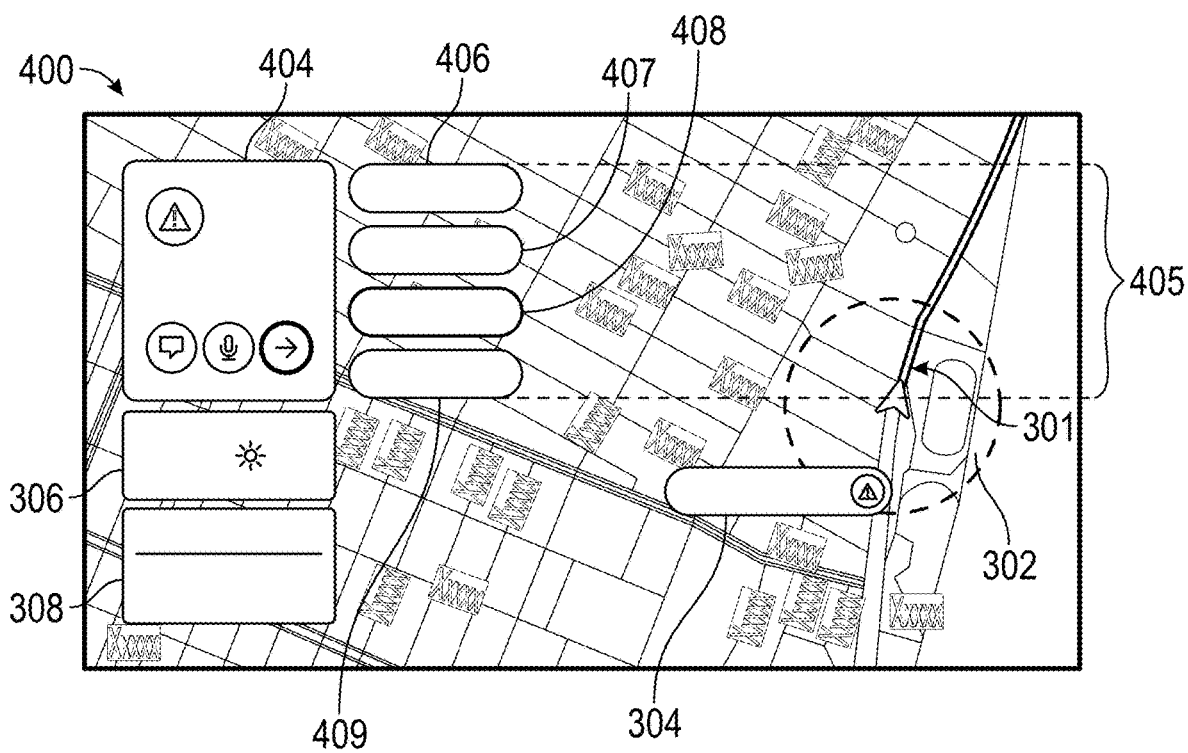

With reference to FIGS. 3 and 4, exemplary illustrations are provided with respect to the obtaining of the driver feedback, in accordance with an exemplary embodiment.

First, as depicted in FIG. 3, a first display 300 is provided for an initial inquiry or notice that is provided to the driver. In various embodiments, the display 300 includes a map that shows a current trajectory 301 of the vehicle 100, along with a radius of interest 302 surrounding the vehicle 100, and other nearby locations along the map. In various embodiments, a notice 304 is provided, requesting feedback. In an exemplary embodiment, the notice 304 provides a message along the lines of the following: "Do you want to provide anonymous feedback", or something along these lines. Also in various embodiments, the display 300 also includes additional information, such as to a location and local temperature 306 and an estimated time of arrival 308 to a destination. In the depicted embodiment, in response to the notice 304, the driver can click on the notice 304 to provide feedback, or alternatively in certain embodiments can also potentially either click on a "dismiss" button 310 or a "maybe later" button 312. In certain embodiments, a potential circumstance 314 is also depicted in the display 300 (e.g., as to a near miss and/other circumstance).

Next, as depicted in FIG. 4, a second display 400 is provided for the driver's feedback, in response to the inquiry of the first display 300. Specifically, in an exemplary embodiment, the second display 400 appears after the driver clicks on the notice 304 of FIG. 3 to provide feedback. As depicted in FIG. 4, in certain embodiments, a new notice 404 is depicted for the driver's feedback. Specifically, in various embodiments, the new notice 404 provides the driver with the opportunity to select one of a plurality of possible circumstances 405 (e.g., explanations) for the conditions. For example, in one example in which a high cognitive load is determined, the possible circumstances 405 may include, among others: (a) high traffic (406); (b) feeling tired (407); (c) construction (408); and/or (d) personal reasons (409). In various embodiments, the driver selects from one of these circumstances 405 to provide the feedback. It will be appreciated that in other embodiments, the new notice 404 and/or circumstances 405 may vary. For example, in certain embodiments, the new notice 404 may indicate an external event, and the circumstances 405 may comprise (a) a school zone; (b) a construction zone; (c) adverse weather conditions; (d) rush hour traffic, and so on, among other possible circumstances in various embodiments.

With reference back to FIG. 2, the data is recorded (step 222). In various embodiments, all of the data and determinations of steps 204-220 (including, without limitation, the external data of step 204, the internal data of step 205, the operational data of step 206, the external events and time stamps of steps 208-210, the cognitive loads of steps 210-212, the time stamps of steps 216-218, and the feedback of step 220) are collected with respect to each of the vehicles 100 in the fleet, and with respect to each of the locations in which the vehicles 100 travel. In various embodiments, the recorded data also includes the correlation between the external and internal events, including without limitation the correlations and relationships between the external events and the cognitive loads, including as described above. Als in various embodiments, all of the data is stored via one or more processor (such as the processor 142 and/or the processor 173 of FIG. 1) in computer memory (such as the memory 144 and/or the memory 174 of FIG. 1) for further use, including for controlling and managing the vehicles 100 in the fleet.

In various embodiments, notifications are provided as to the data (step 224). Specifically, in various embodiments, the entirety of the data from the vehicle 100 (including the sensor data, external events, cognitive load, correlations therebetween, and related data) are transmitted to the remote server 170 (e.g., via the transceiver 126 of the vehicle 100, using the communications network 160). In various embodiments, this (along with the other steps of the process 200) is performed by each of the vehicles 100 in the fleet.

In various embodiments, the data is aggregated and mapped (step 226). Specifically, in various embodiments, the data is aggregated among each of the vehicles 100 in the fleet, and is mapped corresponding to each of the locations in which the vehicles 100 were travelling as the data has been collected. Accordingly, in various embodiments, aggregate and mapped data is generated with respect to various external conditions at specific geographic locations that may be affecting the cognitive load and/or other internal conditions for different vehicles 100 in the fleet in a like manner, and/or for different vehicles that may be facing the same or similar cognitive load effects from the same or similar conditions, regardless of geographic location. For example, in various embodiments, it may be ascertained that different vehicles are facing external conditions at the same locations, and/or that are facing similar internal or external locations regardless of geographic location, and so on, which are affecting the cognitive loads of the respective vehicles 100 in a similar manner, and so on. In certain other embodiments, the cognitive load may be aggregated on the basis of the cognitive load effect, and the proximate cause from various external events, even if they are not in the same time and/or place, for use in determining response actions later on, and so on. In various embodiments, the data aggregation and mapping is performed by one or more processors, such as the processor 173 of FIG. 1. Accordingly, in certain embodiments, the aggregating may pertain at least in part to similar geographic locations.

In various, the aggregated and mapped data is displayed (step 227). Specifically, in various embodiments, aggregated and mapped data is displayed for one or more managers of the fleet of vehicles 100. In certain embodiments, the display is provided via the display 177, in accordance with instructions provided by the processor 173 of FIG. 1.

Figure 5:
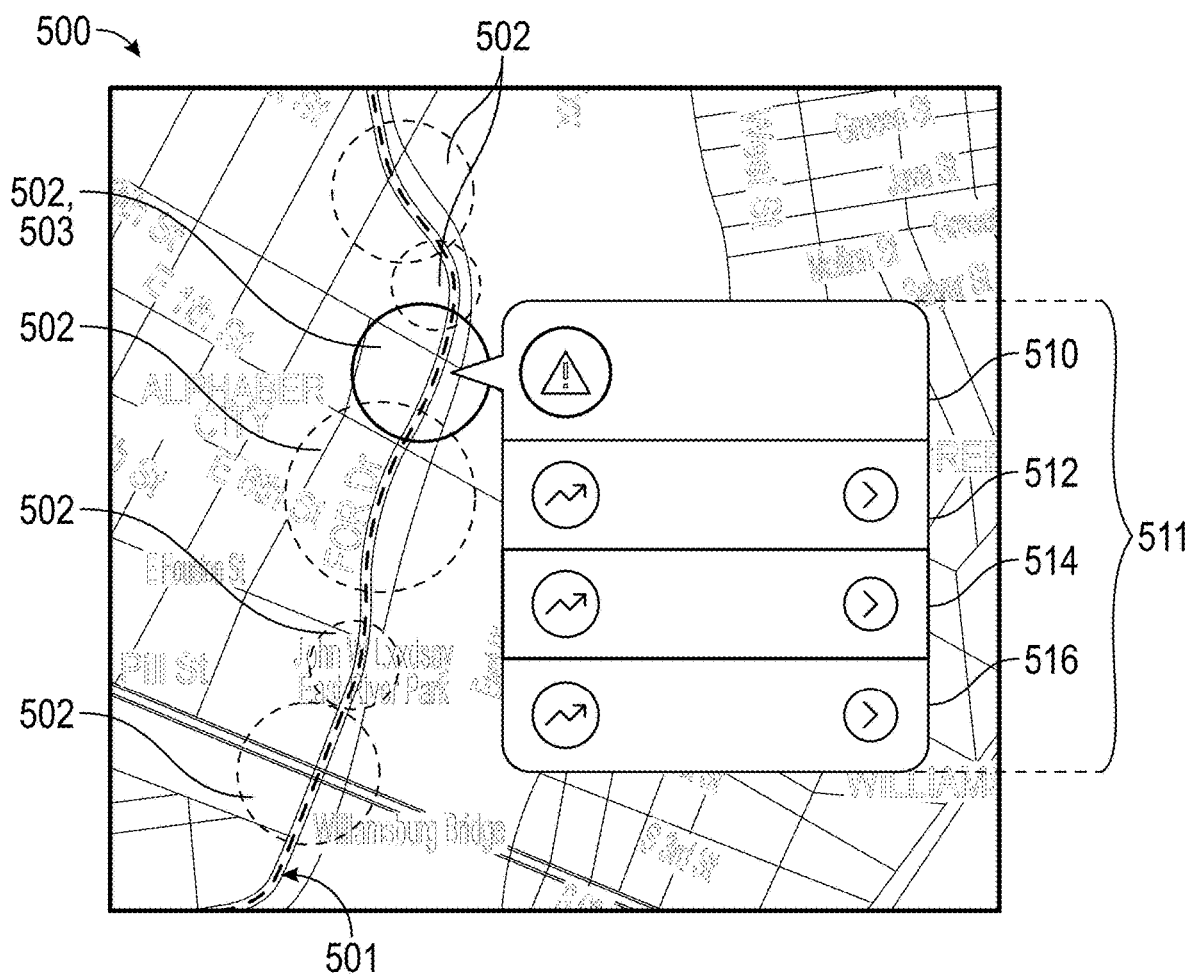
FIG. 5 provides an exemplary illustration of another step of the process of FIG. 2, namely, providing a display for a fleet manager, in accordance with an exemplary embodiment.

With reference to FIG. 5, an exemplary illustration is provided with respect to a display 500 corresponding to the display step 227 of the process 200 of FIG. 2, in accordance with an exemplary embodiment. As depicted in FIG. 5, in an exemplary embodiment, the display 500 includes a direction of travel 501 of the fleet, along with various regions of interest 502 along the direction of travel. In various embodiments, the sizes of the various regions of interest 502 may correspond to a magnitude of the respective cognitive loads of drivers of vehicles 100 that are travelling with respect to the particular region of interest 502 (e.g., with a larger circle representing a larger cognitive load, and so on). Also in various embodiments, one particular region of interest 503 is highlighted, and an notice 510 is provided with respect to that particular region of interest 503. In an exemplary embodiment, the notice 510 provides a notice (e.g., "Elevated Cognitive Load Detected") along with circumstances 511 pertaining to the elevated cognitive load. For example, in one illustrative embodiment, the circumstances may include, among others, (a) high pedestrian activity (512); (b) a construction zone (513); (c) difficulty focusing on driving during peak hours with particularly heavy traffic (516), and so on.

With reference back to FIG. 2, in various embodiments one or more actions are taken (step 228). In various embodiments, based on the display of step 227, one or more fleet managers may take one or more actions in step 228 to exercise control and management of the vehicles 100 in the fleet. For example, in various embodiments, the delivery locations, routes, and/or times may change. In various other embodiments, different drivers may be utilized, drivers may be provided different rest intervals, and/or drivers may be replaced with a new driver after a predetermined amount of time with an elevated cognitive load, and so on, among other possible actions. In certain embodiments, the actions are implemented via transmission of instructions corresponding to the actions to the individual vehicles 100. In various embodiments, the instructions may be received via the transceiver 126 of the vehicle 100 and displayed on the display 124 (e.g., on a display screen thereof) of the vehicle 100. In certain embodiments, the instructions are then implemented via the driver of the vehicle 100, including with respect to operation and movement of the vehicle 100 and further with respect to the routes and timing relating thereto (including with respect to the driver's operation and control of the braking system 106, steering system 108, and/or drive system 110 of the vehicle 100). In certain embodiments, the instructions may be automatically implemented via the control system 102 of the vehicle 100, including via automated control of the braking system 106, steering system 108, and/or drive system 110 of the vehicle 100 in accordance instructions provided via the processor 142 of the vehicle 100.

Also in various embodiments, the actions of step 228, and the prior steps pertaining to cognitive load and external and internal events, also include determinations as to whether the cognitive load of the driver was triggered by internal or external circumstances. In various embodiments, this is performed by one or more processors based on the sensor data, including the internal and external sensor data, and including the feedback provided by the drivers. In various embodiments, the action further comprises one or more real time notifications (including to the driver and the fleet manager, as appropriate) as to the cognitive load and the cause(s) therefor, including whether the cognitive load is believed to be caused by external or internal factors or circumstances (and, in certain embodiments, identifying the specific cause(s) of the cognitive load.

In various embodiments, the process 200 then terminates at 230.

Accordingly, methods, systems, and vehicles are provided for the gathering, aggregation, mapping, and utilization of data pertaining to a fleet of vehicles. In various embodiments, external data, internal data, and operational data from the vehicle are collected, and are correlated with respect to both external events (e.g., traffic conditions, weather, construction zones, and the like) and internal events (e.g., an elevated cognitive load for a driver of the vehicle). In various embodiments, this data is aggregated and mapped, and utilized by one or more fleet managers in controlling the vehicles in the fleet.

It will be appreciated that the systems, vehicles, and methods may vary from those depicted in the Figures and described herein. For example, the system 10 of FIG. 1, including the vehicle 100 and the remote server 170 of FIG. 1 and components thereof, may differ from that depicted in FIG. 1. It will similarly be appreciated that the steps of the processes and implementations of FIGS. 2-5 may differ from those depicted in the Figures, and/or that various steps may occur concurrently and/or in a different order than that depicted in the Figures.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   collecting, via one or more vehicle sensors, sensor data pertaining to a cognitive load of a driver of a vehicle, including by:
      collecting, via one or more internal vehicle sensors, internal data as to circumstances within a cabin of each of a plurality of vehicles of a fleet that may affect the cognitive load; and
      collecting, via one or more external vehicle sensors, external data as to circumstances outside the cabin of each of the plurality of vehicles of the fleet that may affect the cognitive load;
   transmitting, via one or more transceivers, the sensor data, including the internal data and the external data, to a remote server that is physically remote from the plurality of vehicles, via a wireless communications network; and
   determining, via one or more processors, the cognitive load for the driver based on the sensor data;
   providing one or more actions with respect to a driver of the vehicle based on the cognitive load, in accordance with instructions provided by the one or more processors;
   aggregating, via the one or more processors, the internal data and the external data for all of the plurality of vehicles in the fleet, generating aggregated fleet data; and
   providing, via instructions provided by the one or more processors, one or more driver-related control actions for the plurality of vehicles of the fleet, based on the aggregated fleet data.

2. The method of claim 1, further comprising:
   determining, via the one or more processors, one or more external events pertaining to the cognitive load for each of the plurality of vehicles in the fleet;
   determining, via the one or more processors, one or more internal circumstances pertaining to the cognitive load for each of the plurality of vehicles in the fleet, including internal distractions that are likely to cause stress, distraction, or both for the driver; and
   correlating, via the one or more processors, the one or more internal circumstances with the one or more external events for each of the plurality of vehicles in the fleet.

3. The method of claim 2, further comprising:
   obtaining, via one or more input sensors, anonymous feedback from a driver of each of the plurality of vehicles of the fleet, including via the driver's interaction with a display screen, verbal feedback from the driver, or both;
wherein the correlating is performed via the one or more processors further using the anonymous feedback.

4. The method of claim 2, further comprising:
correlating, via the one or more processors, the one or more external events with the cognitive load, based on respective time stamps provided to the one or more external events and to the cognitive load via the one or more processors.

5. The method of claim 4, further comprising:
providing, via a display screen in accordance with instructions provided by the one or more processors, a display for a manger of the fleet, the display including information as to the one or more external events and the cognitive load, including a mapping of the one or more external events and the cognitive load along one or more routes taken by the plurality of vehicles in the fleet, and wherein the display includes a plurality of cognitive load notations corresponding to respective regions of interest along the one or more routes and their corresponding cognitive loads.

6. The method of claim 2, wherein the cognitive load is calculated using the internal data as obtained via one or more biometric sensors for the driver.

7. The method of claim 6, wherein the cognitive load is further calculated using operational data obtained via one or more vehicle sensors pertaining to the driver's operation of a respective one of the plurality of vehicles of the fleet.

8. The method of claim 1, wherein the method further comprises:
determining, via the processor based on the sensor data, whether the cognitive load of the driver was triggered by internal circumstances within the vehicle, or rather by external circumstances that are outside the vehicle; and
providing, via instructions provided by the processor, a notification as to the cognitive load and one or more causes thereof, including whether the cognitive load is believed to be caused by external or internal circumstances.

9. A system comprising:
one or more vehicle sensors configured to collect sensor data pertaining to a cognitive load of a driver of a vehicle, the one or more vehicle sensors comprising:
one or more internal vehicle sensors configured to collect internal data as to circumstances within a cabin of each of a plurality of vehicles of a fleet that may affect the cognitive load; and
one or more external vehicle sensors configured to collect external data as to circumstances outside the cabin of each of the plurality of vehicles of the fleet that may affect the cognitive load;
one or more transceivers configured to transmit the sensor data, including the internal data and the external data, to a remote server that is physically remote from the plurality of vehicles, via a wireless communications network; and
one or more processors that are configured to at least facilitate:
aggregating the internal data and the external data for all of the plurality of vehicles in the fleet, generating aggregated fleet data; and
providing, via instructions provided by the one or more processors, one or more driver-related control actions for the plurality of vehicles of the fleet, based on the aggregated fleet data.

10. The system of claim 9, wherein the one or more processors are further configured to at least facilitate:
determining one or more external events pertaining to the cognitive load for each of the plurality of vehicles in the fleet;
determining one or more internal circumstances pertaining to the cognitive load for each of the plurality of vehicles in the fleet; and
correlating the one or more internal circumstances with the one or more external events for each of the plurality of vehicles in the fleet.

11. The system of claim 10, further comprising:
one or more input sensors configured to obtain anonymous feedback from a driver of each of the plurality of vehicles of the fleet, including via the driver's interaction with a display screen, verbal feedback from the driver, or both;
wherein the one or more processors are configured to perform the correlating further using the anonymous feedback.

12. The system of claim 10, wherein the one or more processors are further configured to at least facilitate correlating the one or more external events with the cognitive load, based on respective time stamps provided to the one or more external events and to the cognitive load via the one or more processors.

13. The system of claim 12, further comprising:
a display screen;
wherein the one or more processors are further configured to at least facilitate providing, via the display screen in accordance with instructions provided by the one or more processors, a display for a manger of the fleet, the display including information as to the one or more external events and the cognitive load, including a mapping of the one or more external events and the cognitive load along one or more routes taken by the plurality of vehicles in the fleet.

14. The system of claim 13, wherein the display includes information as to the one or more external events and the cognitive load, including a mapping of the one or more external events and the cognitive load along one or more routes taken by the plurality of vehicles in the fleet.

15. The system of claim 10, wherein the one or more processors are further configured to calculate the cognitive load using the internal data as obtained via one or more biometric sensors for the driver.

16. The system of claim 15, wherein the one or more processors are further configured to calculate the cognitive load using operational data obtained via one or more vehicle sensors pertaining to the driver's operation of a respective one of the plurality of vehicles of the fleet.

17. The system of claim 9, wherein the processor is further configured to at least facilitate:
determining, based on the sensor data, whether the cognitive load of the driver was triggered by internal circumstances within the vehicle, or rather by external circumstances that are outside the vehicle; and
providing a notification as to the cognitive load and one or more causes thereof, including whether the cognitive load is believed to be caused by external or internal circumstances.

18. A system comprising:
a fleet comprising a plurality of vehicles, each vehicle of the plurality of vehicles including:

one or more internal vehicle sensors configured to collect internal data as to circumstances within a cabin of the vehicle pertaining to a cognitive load of a driver of the vehicle;

one or more external vehicle sensors configured to collect external data as to circumstances outside the cabin of the vehicle pertaining to the cognitive load of the driver of the vehicle;

one or more transceivers configured to transmit the internal data and the external data via a wireless communications network; and a remote server that is physically remote from the plurality of vehicles and that comprises:

a transceiver configured to receive the internal data and the external data from each of the plurality of vehicles of the fleet, via the wireless communications network; and one or more processors that are configured to at least facilitate:

aggregating the internal data and the external data for all of the plurality of vehicles in the fleet, generating aggregated fleet data; and providing one or more driver-related control actions for the plurality of vehicles of the fleet, based on the aggregated fleet data and the cognitive load.

* * * * *